Patented Dec. 11, 1934

1,984,146

UNITED STATES PATENT OFFICE 1,984,146

PRODUCTION OF DISODIUM PHOSPHATE

Nils Carlson Lindberg, Crete, Ill., assignor to Victor Chemical Works, a corporation of Illinois No Drawing. Application July 16, 1932, Serial No. 623,009

5 Claims. (Cl. 23—107)

This invention relates to a method of preparing pure anhydrous disodium phosphate.

In preparing anhydrous di-sodium phosphate from phosphoric acid and sodium carbonate and/or some other alkaline sodium compound such as caustic soda or tri-sodium phosphate, the ordinary steps of filtration plus evaporation to dryness, following the neutralization reaction, do not result in a di-sodium phosphate which will produce an entirely clear water solution. This is due chiefly to impurities such as silica and iron and aluminum compounds which are water insoluble in the final product, but which are not precipitated and removed by the preceding filtration.

According to the present invention a substantially pure di-sodium phosphate may be prepared from phosphoric acid, preferably concentrated phosphoric acid such as is produced by a volatilization process, for example, by the blast furnace or electric furnace methods, by carefully controlling the conditions at the end point of the reaction and then maintaining the solution under such conditions until the impurities have precipitated out. For example, concentrated phosphoric acid is mixed with soda ash or caustic soda or both, and water added, if necessary, sufficient to produce a Bé. gravity of preferably 52-54° (as measured at 80° C.). It is preferred to use soda ash for the first part of the neutralization and caustic soda or tri-sodium phosphate for the final neutralization.

For example, 7094 lbs. 75% phosphoric acid, 5400 lbs. soda ash, 340 lbs. caustic soda, or 2400 lbs. tri-sodium phosphate give a solution of the proper proportions.

The pH of the mixture is adjusted so that the pH of a diluted test sample, prepared by diluting 10 cc. of the 52-54° Bé. solution with 50 cc. of water will be approximately 8.90, say from 8.85 to 9.00, preferably 8.85 to 8.95. The reaction mixture is then heated, preferably to 100° C. or above, and agitated until a test of the filtered solution shows no trace of iron or aluminum impurities, for example, as shown by the ammonium acetate test. It is evident that in the above process the phosphoric acid may be replaced by mono-sodium phosphate.

Precipitation of the impurities is rendered more rapid by increase in temperature, and it is, therefore, preferred to boil the solution in order to save time. However, at lower temperatures complete elimination of the impurities may be secured by allowing a longer period for precipitation.

For example, a 52° Bé. solution (as measured at 80° C.) showed complete absence of iron and aluminum after two hours of boiling (106° C.). A similar solution agitated at 100° C. required approximately six hours for complete removal of the impurities. It is preferred to agitate the solution in order to hasten the precipitation.

Diminution in the gravity of the solution below 52-54° Bé. results in a decrease in the rate of precipitation. For example, solutions treated under identical conditions as to pH showed a freedom from iron and aluminum impurities after two hours of boiling where the Bé. gravity was 53°, whereas a solution having a Bé. gravity of 43.5° still showed traces of impurities after nine hours of boiling. Solutions having a Bé. gravity below 40° (as measured at 80° C.) do not appear to completely precipitate impurities when treated by this method.

After a sample filtrate shows no iron or aluminum upon test, the impurities may be removed from the main body of liquid, for example, by filtering, and the solution then evaporated to dryness in the desired manner, as, for example, spray or film drying of any type.

It is preferred to dilute solutions over 50° Bé. to a gravity between 42 and 50° prior to filtration, in order to facilitate the filtering operation. Where it is desired to crystallize di-sodium phosphate, the dilution may be carried further. It has been discovered that dilution of the mixture carries back into solution a small portion of the iron and aluminum impurities. By proceeding in accordance with this invention these impurities may be overcome by again heating the solution, for example, by boiling for a period of 30-45 minutes. The heating is continued, preferably with agitation, until all of the iron and aluminum have again been precipitated.

When hard water is used to dilute the solution, such heating will also remove the hardness, thereby further purifying the product.

A further improvement may be accomplished by the use of tri-sodium phosphate for the final neutralization of the phosphoric acid. It has been discovered that by using tri-sodium phosphate instead of caustic soda, the silica remaining in the di-sodium phosphate is practically all in soluble form, whereas with caustic soda a considerably greater portion of the silica appears in the final product in insoluble form.

A water solution of di-sodium phosphate produced in the above manner is practically perfect, the amount of insoluble material being in the neighborhood of .002 to .01%, and consisting essentially of hydrated silica. By proceeding in accordance with this invention, it has been discovered that practically all of the silica in the final product is rendered soluble.

The foregoing detailed description has been given for clearness of understanding only, and no unnecessary limitations should be understood therefrom, but the appended claims should be construed as broadly as permissible, in view of the prior art.

I claim:

1. In the method of producing purified di-sodium phosphate which comprises producing a solution of di-sodium phosphate by reaction of an acid phosphate with an alkaline sodium compound and heating the completed reaction mixture at controlled concentration and pH until the iron and aluminum impurities have been completely precipitated, and in which the solution is thereafter diluted, the further step which comprises again heating the solution after dilution until iron and aluminum impurities redissolved by the dilution are again completely precipitated.

2. In the method of producing purified di-sodium phosphate which comprises producing a solution of di-sodium phosphate by reaction of phosphoric acid produced by a volatilization method with an alkaline sodium compound and heating the completed reaction mixture at controlled concentration and pH until the iron and aluminum impurities have been completely precipitated, and in which the solution is thereafter diluted, the further step which comprises again heating the solution after dilution until iron and aluminum impurities redissolved by the dilution are again completely precipitated.

3. The method as set forth in claim 2 in which the further heating is carried out while maintaining a temperature not substantially less than 100° C.

4. The method as set forth in claim 2 in which the further heating is carried out while boiling said solution.

5. The method as set forth in claim 2 in which the diluted solution is heated while at Bé. gravity not less than 40°.

NILS CARLSON LINDBERG.